(12) United States Patent (10) Patent No.: US 8,441,906 B2
Tomita et al. (45) Date of Patent: May 14, 2013

(54) INFORMATION RECORDING MEDIUM, INFORMATION RECORDING APPARATUS, AND INFORMATION REPRODUCING APPARATUS

(75) Inventors: Yoshimi Tomita, Wako (JP); Keiji Katata, Saitamaken (JP)

(73) Assignee: Pioneer Corporation, Kanagawa (JP)

( * ) Notice: Subject to any disclaimer, the term of this patent is extended or adjusted under 35 U.S.C. 154(b) by 0 days.

(21) Appl. No.: 13/496,026

(22) PCT Filed: Nov. 6, 2009

(86) PCT No.: PCT/JP2009/069004
§ 371 (c)(1),
(2), (4) Date: Mar. 4, 2012

(87) PCT Pub. No.: WO2011/055453
PCT Pub. Date: May 12, 2011

(65) Prior Publication Data
US 2012/0170430 A1 Jul. 5, 2012

(51) Int. Cl.
*G11B 7/24* (2006.01)
*G11B 7/007* (2006.01)

(52) U.S. Cl.
USPC .......................................... 369/94; 369/59.25

(58) Field of Classification Search ............... 369/30.04, 369/30.09, 94, 275.1–275.4, 13.39, 13.4, 369/59.25, 93
See application file for complete search history.

(56) References Cited

U.S. PATENT DOCUMENTS

| | | | |
|---|---|---|---|
| 7,313,082 B2* | 12/2007 | Noda et al. | ................. 369/275.3 |
| 2006/0239132 A1 | 10/2006 | Van Rompaey et al. | |
| 2007/0121429 A1 | 5/2007 | Nakahara et al. | |
| 2007/0253301 A1 | 11/2007 | Nakahara et al. | |
| 2007/0253302 A1 | 11/2007 | Nakahara et al. | |
| 2007/0253306 A1 | 11/2007 | Takahashi et al. | |
| 2007/0263496 A1 | 11/2007 | Nakahara et al. | |
| 2007/0263497 A1 | 11/2007 | Nakahara et al. | |
| 2007/0263498 A1 | 11/2007 | Nakahara et al. | |
| 2007/0263499 A1 | 11/2007 | Nakahara et al. | |
| 2007/0263500 A1 | 11/2007 | Nakahara et al. | |
| 2007/0274183 A1 | 11/2007 | Nakahara et al. | |
| 2008/0025183 A1 | 1/2008 | Nakahara et al. | |
| 2008/0043609 A1 | 2/2008 | Kato et al. | |
| 2008/0056096 A1 | 3/2008 | Nakahara et al. | |
| 2008/0056097 A1 | 3/2008 | Nakahara et al. | |
| 2008/0056098 A1 | 3/2008 | Nakahara et al. | |
| 2008/0068969 A1 | 3/2008 | Nakahara et al. | |
| 2008/0123497 A1 | 5/2008 | Nakahara et al. | |
| 2008/0130464 A1 | 6/2008 | Nakahara et al. | |
| 2008/0219142 A1 | 9/2008 | Fusushima | |
| 2009/0034387 A1* | 2/2009 | Hamasaka | ....................... 369/94 |

FOREIGN PATENT DOCUMENTS

| | | |
|---|---|---|
| JP | 8-287474 | 11/1996 |
| JP | 2006-260744 | 9/2006 |

(Continued)

OTHER PUBLICATIONS

International Search Report, PCT/JP2009/069004, Feb. 2, 2010.

*Primary Examiner* — Joseph Haley
*Assistant Examiner* — Andrew Sasinowski
(74) *Attorney, Agent, or Firm* — Young & Thompson

(57) ABSTRACT

An information recording medium (100) of the present invention has a plurality of recording layers (110, 120, 130, and 140) for recording therein data. Each of the plurality of recording layers corresponds to one of a plurality of recording formats. A first recording layer number (SLN) assigned with each of the recording layers in accordance with a disposed position of each of the recording layer and a second recording layer number (LLN) assigned with corresponding recording format are included in the address area (14) for the data, with respect to each of the plurality of recording layer.

15 Claims, 5 Drawing Sheets

FOREIGN PATENT DOCUMENTS

| | | |
|---|---|---|
| JP | 2007-500410 | 1/2007 |
| JP | 2007-026617 | 2/2007 |
| JP | 2008-251147 | 10/2008 |
| JP | 2009-037705 | 2/2009 |
| JP | 2009-176335 | 8/2009 |
| WO | WO 2005/076268 | 8/2005 |
| WO | WO 2006/003978 | 1/2006 |
| WO | WO 2006/038633 | 4/2006 |

* cited by examiner

FIG. 2

| Signal Layer Number(SLN) | Layer Set | Logical Layer Number(LLN) |
|---|---|---|
| SL0 | Layer Set 0 | LL0 |
| SL1 | | LL1 |
| SL2 | Layer Set 1 | LL0 |
| SL3 | | LL1 |

(a) ECC block (b) BIS block

INFORMATION RECORDING MEDIUM, INFORMATION RECORDING APPARATUS, AND INFORMATION REPRODUCING APPARATUS

TECHNICAL FIELD

The present invention relates to, for example, an information recording medium such as an optical disc on which data can be recorded and reproduced by applying laser light onto each of a plurality of recording layers, an information recording apparatus for recording the data onto the information recording medium, and an information reproducing apparatus for reproducing the data recorded on the information recording medium.

BACKGROUND ART

Recently, as an information recording medium suited for distribution and long-term storage of a large amount of data, an optical disc has attracted attention. As a recording format for recording the data on the optical disc, there are known: (1) a read-only type in which embossed pits are formed in a recording layer by stamping in manufacturing and only the embossed pits can be reproduced; (2) a write-once type in which a recording film including pigment or the like is used for the recording layer and recording can be performed only once; (3) a rewritable type in which a magneto-optical recording film or a phase change recording film is used for the recording layer and data can be rewritten and deleted many times; and the like.

In order to respond to a requirement to increase a capacity of the optical disc as described above, there has been suggested an optical disc with a plurality of recording layers laminated. Conventionally, in the multilayer optical disc, the plurality of recording layers correspond to a single recording format. Each recording layer has a physical structure according to the recording format, and the recording layers share a logical structure according to the recording format.

Now, as an example of the shared logical structure, an explanation will be given to an area structure and assignment of a sector number in an optical disc of a dual-layer opposite track path type. Firstly, in a first recording layer (i.e. L0 layer), there are provided a lead-in area, a data area, and a middle area from an inner circumferential side to an outer circumferential side, and the sector number in a recording area of the optical disc increases from the inner circumferential side to the outer circumferential side. On the other hand, in a second recording layer (i.e. L1 layer), there are provided a middle area, a data area, and a lead-out area from the outer circumferential side to the inner circumferential side, and the sector number in the recording area of the optical disc, which is continued from a turn-around point in the L0 layer, increases from the outer circumferential side to the inner circumferential side. As described above, even in the case of the optical disc having the plurality of recording layers, if each recording layer corresponds to the same recording format, the optical disc is constructed from one type of the logical address.

An optical disc apparatus for performing the recording or reproduction on the optical disc detects a data recording position or reproduction position with reference to the sector number assigned in each data area and a recording layer number for specifying each recording layer.

BACKGROUND ART DOCUMENT

Patent Document

Patent document 1: International Publication No. WO2005/076268

DISCLOSURE OF INVENTION

Subject to be Solved by the Invention

In the conventional optical disc, for example, the recording layer number for specifying each recording layer in the optical disc is recorded in an address field which is in an ECC block. As described above, since one optical disc is constructed from one type of the logical address, the recording layer number for specifying each recording layer in the optical disc indicates the same information as a recording layer number for specifying each recording layer in the one type of the logical address.

Recently, with diversity of application of the optical disc, a multilayer optical disc having a plurality of recording formats has been studied. For example, such an optical disc has been developed in recent years, that one or a plurality of recording layers out of the laminated plurality of recording layers correspond to a first recording format and that another one or a plurality of recording layers correspond to a second recording format. Such an optical disc has a plurality of types of the logical addresses each corresponding to respective one of the plurality of recording formats.

Even in the optical disc having the plurality of types of the logical address, the recording layer number needs to be assigned to each recording layer in order to detect the data recording position or reproduction position. However, due to presence of the plurality of types of the logical address, the recording layer number for specifying each recording layer in the optical disc and the recording layer number for specifying each recording layer in one type of the logical address are different from each other.

Conventionally, in a typical rewritable optical disc, the first recording layer (i.e. L0 layer) in one type of the logical address is provided with the lead-in area and a start point of the sector number. In a conventional software module, since the recording layer number and the logical address have a unique correspondence relation as described above, the recording layer can be specified with reference to the recording layer number.

On the other hand, in the case of the recording layer number sequentially assigned to each recording layer in order to specify each recording layer in the optical disc, the recording layer number different from L0 is likely assigned to the first recording layer in one recording format (i.e. one type of the logical address). Thus, for example, there is a possibility that it is hardly possible to appropriately detect the recording layer in which there is the lead-in area, wherein in the lead-in area, information for recording the data into the recording layer corresponding to the one recording format is recorded. Moreover, the correspondence relation between the recording layer number and the logical structure, defined in the conventional software module, cannot be applied, which causes such a technical problem that the optical disc cannot be handled.

On the other hand, if the recording layer number is assigned (in order of L0, L1, and so on) in accordance with each type of the logical address corresponding to each recording format, there may be a plurality of recording layers (e.g. there are a plurality of L0s) to each of which the same recording layer number is assigned, among the recording formats of different types of the logical address, and the recording layer cannot be appropriately specified.

In view of the aforementioned problem, it is therefore an object of the present invention to provide an information recording medium which allows appropriate specification of a target recording layer, for example, in a multilayer optical disc having a plurality of logical structures, and an information recording apparatus and an information reproducing apparatus intended for such an information recording medium.

Means for Solving the Subject

The above object of the present invention can be achieved by an information recording medium having a plurality of recording layers for recording therein data, wherein (i) each of the plurality of recording layers is provided with a data area in which the data is recorded and an address area in which a recording address of the data is recorded, (ii) each of the plurality of recording layers corresponds to respective one of a plurality of recording formats, and (iii) each of the plurality of recording layers has a first recording layer number assigned by each of the recording layers and a corresponding second recording layer number assigned by corresponding recording format, and the first recording layer number and the second recording layer number are included in the address area.

The above object of the present invention can be also achieved by an information recording apparatus for recording the data onto the information recording medium described above, the information recording apparatus provided with: a referring device for referring to the first recording layer number and the second recording layer number which are included in the address area of the information recording medium; and a recording device for recording the data on the basis of the first recording layer number and the second recording layer number which are referred to, the recording device records the data while including the first recording layer number and the second recording layer number in the address area for the data.

The above object of the present invention can be also achieved by an information reproducing apparatus for reproducing the data which is recorded on the information recording medium described above, the information reproducing apparatus provided with: a referring device for referring to the first recording layer number and the second recording layer number which are included in the address area of the information recording medium; and a reproducing device for reproducing the data on the basis of the first recording layer number and the second recording layer number which are referred to.

The operation and other advantages of the present invention will become more apparent from embodiments explained below.

BRIEF DESCRIPTION OF DRAWINGS

FIG. 2 is an example showing a data table indicating a correspondence relation between recording layer numbers stored on the optical disc in the example.

MODE FOR CARRYING OUT THE INVENTION

<1>

Figure 1:
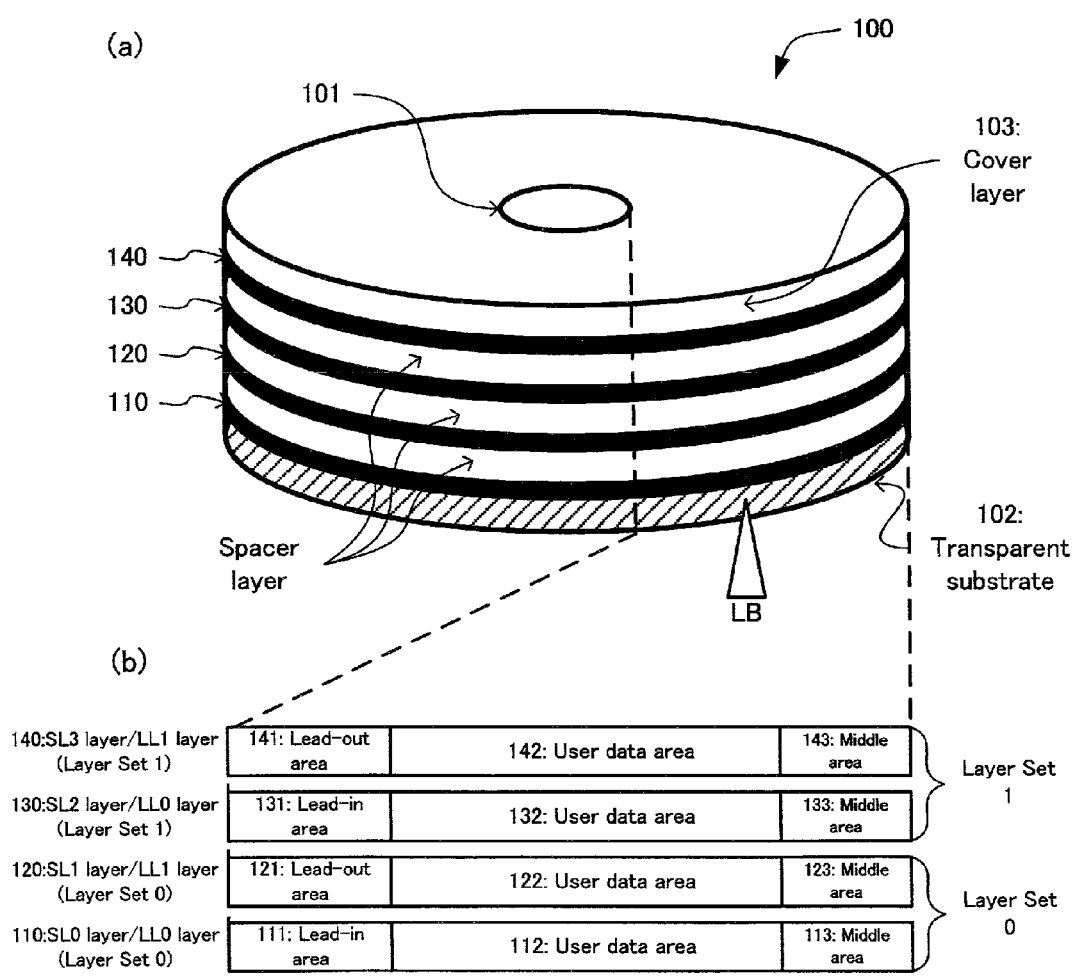
FIG. 1 are conceptual views showing a basic structure of an optical disc in an example, including a conceptual view showing the optical disc and a schematic conceptual view showing a recording area structure in a radial direction of the optical disc.

An information recording medium in an embodiment of the present invention is an information recording medium having a plurality of recording layers for recording therein data, wherein each of the plurality of recording layers is provided with a data area in which the data is recorded and an address area in which a recording address of the data is recorded, (ii) each of the plurality of recording layers corresponds to one of a plurality of recording formats, and (iii) each of the plurality of recording layers has a first recording layer number assigned with each of the recording layers and a second recording layer number assigned with corresponding recording format, and the first recording layer number and the second recording layer number are included in the address area.

According to the information recording medium in the embodiment of the present invention, there is configured the information recording medium, such as an optical disc, having the plurality of recording layers laminated, each of which corresponds to one of the plurality of recording formats. Specifically, the recording layers have such a structure that one or a plurality of recording layers out of the laminated plurality of recording layers correspond to a first recording format and that another or a plurality of recording layers correspond to a second recording format. Incidentally, the information recording medium may be provided with a recording layer having a structure corresponding to an additional recording format such as a third recording format. Here, the plurality of recording formats are for defining data recording aspects, such as, for example, a read-only type, a write-once type, and a rewritable type, as described later. Moreover, a recording layer corresponding to a predetermined recording format, in effect, indicates a recording layer having physical and logical structures which allows data recording/reproduction in the relevant recording format.

In the information recording medium in the embodiment, each of the recording layers has the data area in which the data is recorded and the address area in which address information indicating a portion at which the data is recorded. Thus, an information recording apparatus for recording the data onto the information recording medium in the embodiment is preferably adapted to obtain a recording position of the data with reference to the address information and to record the address information about the portion at which the data is recorded into the address area. On the other hand, an information reproducing apparatus for reproducing the data from the information recording medium in the embodiment is preferably adapted to obtain the recording position of the data to be reproduced with reference to the address information.

To each of the plurality of recording layers provided for the information recording medium in the embodiment, the first recording layer number and the second recording layer number are assigned.

The first recording layer number is a sequential recording layer number which is uniquely assigned by each of the recording layers of the information recording medium. The first recording layer number is assigned, for example, in accordance with disposed positions in which each of the recording layers is laminated. Specifically, the first recording layer numbers are assigned in such an aspect that, SL0, SL1 and so on are sequentially assigned to the respective recording layers included in the information recording medium in descending order of a distance between respective recording layers and an optical pickup for the recording/reproduction. Thus, for example, by reading the first recording layer number in one sector and the sector number, a position of the sector in the information recording medium can be absolutely (in other words, uniquely) determined.

The second recording layer number is a sequential recording layer number which is uniquely assigned by each recording format to which each of the recording layers of the information recording medium corresponds. The second recording layer numbers are assigned, for example, in accordance with the logical structure in the corresponding recording layers, by each recording format. For example, in a plurality of recording layers corresponding to the rewritable type out of the plurality of recording formats, LL0, LL1, and so on are assigned sequentially from the recording layer in which the sector number starts. Moreover, in a plurality of recording layers corresponding to the read-only type on the same information recording medium, LL0, LL1, and so on are assigned sequentially from the recording layer in which the sector number starts. Therefore, in one information recording medium, there may be the recording layer to which the same second recording numbers are assigned by the respective formats, such as LL0, LL1, and so on in the rewritable type and LL0, LL1 and so on in the read-only type. As described above, according to the second recording layer number, it is possible to relatively specify each recording layer of the information recording medium by each recording format.

The optical disc has a logical address series corresponding to each of the plurality of recording formats. Incidentally, a physical address on the optical disc is recorded by using the second recording layer number assigned in accordance with the logical address series and a physical address in the recording layer. In the data reproduction, the physical address is converted to a logical address on the basis of a certain rule, and thus, the sector in which desired data is recorded is specified.

Normally, the logical address is a sequential number which starts from 0. The same conversion method is preferably provided in each logical address series.

However, the number and positions of the recording layer(s) corresponding to each recording format vary depending on the design of the optical disc in some cases. At this time, a correspondence relation between the first recording layer number and the second recording layer number changes in some cases depending on the number of the recording layers. For example, an explanation will be given to an optical disc having four recording layers to which SL0, SL1, SL2, and SL3 are assigned as the first recording layer number, respectively. The correspondence relations between the first recording layer number and the second recording layer number on an optical disc in which SL0 and SL1 correspond to the first recording format and SL2 and SL3 correspond to the second recording format is different from that on an optical disc in which SL0, SL1, and SL2 correspond to the first recording format and SL3 corresponds to the second recording format. Specifically, in the former optical disc, the recording layer SL0 and the recording layer SL2 are the first recording layers in the first and second recording formats, respectively. Thus, LL0 is assigned, as the second recording layer number, to each of the recording layer SL0 and the recording layer SL2. The recording layer SL1 and the recording layer SL3 are the second recording layers in the first and second recording formats, respectively. Thus, LL1 is assigned, as the second recording layer number, to each of the recording layer SL1 and the recording layer SL3. On the other hand, in the latter optical disc, the recording layer SL0 and the recording layer SL3 are the first recording layers in the first and second recording formats, respectively. Thus, LL0 is assigned, as the second recording layer number, to each of the recording layer SL0 and the recording layer SL3. The recording layer SL1 and the recording layer SL2 are the second and third recording layers in the first recording format, respectively. Thus, LL1 and LL2 are assigned, as the second recording layer numbers, to each of the recording layer SL1 and the recording layer SL2, respectively. Incidentally, the recording layer SL0 is the recording layer to which SL0 is assigned as the first recording layer number. This is true for the other recording layers. As described above, if the recording format corresponding to each of the recording layers of the optical disc is not recognized, it is hardly possible to uniquely derive one recording layer number from the other recording layer number.

Moreover, the first recording layer number corresponds to physical information (e.g. a laminated position, etc.) for each recording layer of the information recording medium. For example, if a layer jump is performed, it is necessary to determine a jump amount (i.e. amount of adjusting an optical axis of an optical pickup) depending on thickness between the recording layers between which the layer jump is performed. In general, the thickness between the recording layers (e.g. thickness of a spacer layer) varies in order to suppress an influence of a crosstalk between the recording layers. Thus, in order to determine the jump amount for performing an appropriate layer jump, a current recording layer needs to be uniquely specified in the information recording medium.

The data area in each recording layer of the information recording medium in the embodiment preferably has a sector structure. In the address area of each sector, at least the first recording layer number and the second recording layer number are written.

Thus, according to a recording/reproducing apparatus for performing information recording/reproduction on the information recording medium, it is possible to easily specify an absolute position of the recording layer in which there is a current recording/reproduction position and to specify a relative position in each recording format, with reference to the address area of each sector.

Incidentally, the correspondence relation between the first recording layer number and the second recording layer number is preferably stored, for example, in the lead-in area (e.g. the lead-in area provided for the first recording layer in each recording format) in the information recording medium as a data table. Thus, the information recording apparatus and the information reproducing apparatus can easily obtain the correspondence relation between the first recording layer number and the second recording layer number, with reference to the data table stored in the lead-in area.

According to the information recording medium in the embodiment of the present invention described above, it is possible to specify the recording layer in which there is the current recording/reproduction position, with reference to the first recording layer number included in the address area of each sector in performing the layer jump. Thus, it is possible to appropriately determine the jump amount for performing the layer jump to the recording layer as a jump destination.

Moreover, in the plurality of recording layers sharing the same recording format, since different sector numbers are assigned to each of the recording layers has (e.g. in the recording layers of an opposite track path type, the sector number increases from the inner circumferential side to the outer circumferential side in a L0 layer, whereas the sector increases from the outer circumferential side to the inner circumferential side in a L1 layer), a different decoding method for the recording/reproduction is adapted to each recording layer.

According to the information recording medium in the embodiment of the present invention described above, it is possible to specify a position in the corresponding recording format (in other words, logical structure) of the recording layer in which there is the current recording/reproduction position, with reference to the second recording layer number included in the address area of each sector, and it is also possible to determine an appropriate decoding method in accordance with the position.

As described above, according to the second recording layer number, one recording layer can be relatively specified from among one or a plurality of recording layers corresponding to each recording format. Thus, for example, after the specification of the recording layer in which there is the current recording/reproduction position, it is possible to easily specify the recording layer in which there is the lead-in area in the recording format. Then, it is possible to perform the layer jump to the recording layer having the lead-in area on the basis of the first recording layer number described above.

Incidentally, in the embodiment, the first recording layer number and the second recording layer number may be recorded in each of or a combination of the address area of each sector, a flag bit area included in the ECC block of each sector, and a combined area of a plurality of flag bit areas, as occasion demands, as adopted in a conventional DVD or BD. Moreover, the first and second recording layer numbers may be incorporated within the sector number in an aspect by which each recording layer can be identified. The address area in the present invention may conceptually and broadly include an area in which layer number information can be recorded, as described above.

Incidentally, the information recording medium in the embodiment adopts so-called address in pre-groove (ADIP) in which the first recording layer number, the second recording layer number, and the sector number or the like are pre-formatted in a wobble or the like in advance, particularly in each recording layer corresponding to the rewritable or write-once recording format. Thus, the information recording apparatus for recording data onto the information recording medium in the embodiment can specify the data recording position with reference to the preformatted information when recording the data.

Moreover, in the information recording medium in the embodiment, particularly in the recording layer corresponding to the read-only type recording format, embossed pits are preferably generated by a stamp such that the first recording layer number and the second recording layer number are included in the address area, for example, in disc manufacturing.

As explained above, according to the information recording medium in the embodiment of the present invention, it is possible to absolutely specify each recording layer of the information recording medium and to specify each recording layer in each recording format, with reference to the first recording layer number and the second recording layer number included in each sector in which the data is recorded.

<2>

In one aspect of the information recording medium of the present invention, the plurality of recording formats include at least one of a read-only type, a write-once type, and a rewritable type.

According to this aspect, each of the plurality of recording layers provided for the information recording medium is adapted to have the physical and logical structures corresponding to one of the recording formats including at least one of the read-only type, the write-once type, and the rewritable type. Thus, it is possible to preferably detect each recording layer corresponding to one of the recording formats, with reference to the address area of each data area including the first recording layer number and the second recording layer number.

Therefore, it is possible to record the data in the plurality of recording formats according to their applications and to reproduce the data, relatively easily.

<3>

An information recording apparatus in an embodiment of the present invention is an information recording apparatus for recording the data onto the information recording medium described above, the information recording apparatus provided with: a referring device for referring to the first recording layer number and the second recording layer number which are included in the address area of the information recording medium; and a recording device for recording the data on the basis of the first recording layer number and the second recording layer number which are referred to, wherein the recording device records the data while including the first recording layer number and the second recording layer number in the address area for the data.

According to the information recording apparatus in the embodiment of the present invention, it is possible to preferably record the data onto the information recording medium in the embodiment described above. Moreover, the information recording apparatus in the embodiment records the data while including the first recording layer number and the second recording layer number in the address area for the data to be recorded on the information recording medium.

The referring device is typically a control unit of the information recording apparatus capable of reading the address information recorded on the information recording medium such as an optical disc. The referring device obtains the first recording layer number and the second recording layer number in a current recording layer, for example, by decoding the address information preformatted in a wobble or the like.

The recording device detects a data writing position on the basis of the first recording layer number and the second recording layer number which are obtained. For example, the recording device specifies the recording layer provided with the lead-in area in one recording format, on the basis of the second recording layer number. Then, the recording device detects the recording layer in which the data can be written on the basis of the data indicating the correspondence relation between the first recording layer number and the second recording layer number stored in the lead-in area. Then, the recording device determines the data writing position on the basis of the address information (e.g. sector number) preformatted in the wobble or the like in the recording layer. Then, after determining the data writing position, the recording device records the data at the predetermined writing position while including the first recording layer number and the second recording layer number in the address area.

By virtue of such a configuration, it is possible to record the data while receiving various effects that can be received by the information recording medium in the embodiment of the present invention described above.

<4>

An embodiment of the information reproducing apparatus of the present invention is an information reproducing apparatus for reproducing the data which is recorded on the information recording medium described above, the information reproducing apparatus provided with: a referring device for referring to the first recording layer number and the second recording layer number which are included in the address area of the information recording medium; and a reproducing device for reproducing the data on the basis of the first recording layer number and the second recording layer number which are referred to.

According to the information reproducing apparatus in the embodiment of the present invention, it is possible to preferably reproduce the data recorded on the information recording medium in the embodiment described above.

In the data reproduction, the referring device obtains the first recording layer number and the second recording layer number included in the address area for the recorded data.

The reproducing device detects the recording layer in which target data is recorded, on the basis of the first recording layer number and the second recording layer number which are obtained. In particular, the reproducing device specifies the current recording layer on the basis of the first recording layer number for specifying the recording layer of the information recording medium and performs the layer jump to the recording layer in which the target data is recorded.

Then, the reproducing device determines the target data position and reproduces the data on the basis of the address information (e.g. sector number) about each data recorded in the recording layer.

By virtue of such a configuration, it is possible to reproduce the data while receiving various effects that can be received by the information recording medium in the embodiment of the present invention described above.

As explained above, according to the information recording medium in the embodiment of the present invention, in the information recording medium having the plurality of recording layers each of which corresponds to one format out of the plurality of recording formats, the first recording layer number and the second recording layer number are included in the address area for the recorded data. According to the information recording apparatus in the embodiment of the present invention is provided with the referring device and the recording device. According to the information reproducing apparatus in the embodiment of the present invention is provided with the referring device and the reproducing device. Therefore, it is possible to specify an appropriate recording layer on the information recording medium provided with the plurality of recording layers corresponding to one of the plurality of recording formats.

EXAMPLES

Hereinafter, with reference to the drawings, examples of the present invention will be explained.

(1) Basic Configuration Example of Information Recording Medium

Firstly, with reference to FIGS. 1, an optical disc 100 as an example of the information recording medium of the present invention will be explained. FIGS. 1 are conceptual views showing a basic structure of the optical disc 100 in the example, wherein FIG. 1(*a*) shows a conceptual view showing the optical disc 100 and FIG. 1(*b*) shows a corresponding schematic conceptual view showing a recording area structure in a radial direction of the optical disc 100.

As shown in FIG. 1(*a*) and FIG. 1(*b*), the optical disc 100 is, for example, a disc with a diameter of about 12 cm as in a Blu-ray Disc (BD). For example, recording layers 110, 120, 130, and 140, which constitute one example of the plurality of recording layers of the present invention, and a cover layer 103 are laminated on a transparent substrate 102. Moreover, spacer layers are laminated between the respective recording layers, respectively. Preferably, each of the spacer layers between the respective recording layers has a different thickness. Moreover, in each recording area of the recording layer, for example, tracks such as a groove track and a land track are alternately disposed, spirally or concentrically, centered on a center hole 101. Moreover, on the tracks, data is divided and recorded by a unit of error collection code (ECC) block. The ECC block is a data management unit by which record information can be error-corrected.

In recording/reproduction of such a multilayer optical disc 100, by setting a focus position of a laser beam LB irradiated from the lower side to the upper side in FIG. 1(*a*) on a predetermined recording layer, various data such as user data is recorded or reproduced in the recording layer.

In particular, each recording layer of the optical disc in the example corresponds to one of different recording formats. The recording layers 110 and 120 correspond to a rewritable recording format (e.g. BD-RE) and the recording layers 130 and 140 correspond to a write-once recording format (e.g. BD-R). Thus, physical and logical structures for the recording layers 110 and 120 are typically different from those for the recording layers 130 and 140.

Specifically, a recording film provided for each of the recording layers 110 and 120 includes, for example, a phase change film. The phase change film transfers between a crystalline state and a non-crystalline state (amorphous state), which allows a plurality of times of data recording into the same area portion. On the other hand, a recording film provided for each of the recording layers 130 and 140 uses a recording film with pigment applied thereon. The pigment is reformed by the irradiation of the laser beam, which allows only one time of data recording in the recording film. A difference in the logical structure between the respective recording layers will be described later.

Incidentally, hereinafter, a set of a plurality of recording layers which correspond to the same recording format and which are sequentially disposed (i.e. laminated), such as a set of the recording layers 110 and 120, is referred to as a layer set. Incidentally, in each layer set, a layer set number, which is a sequential number, is set. Incidentally, in FIG. 1(*a*), the recording layers 110 and 120 belong to a layer set 0, and the recording layers 130 and 140 belong to a layer set 1.

Recording layer numbers are assigned, such as SL0 layer/LL0 layer 110, SL1 layer/LL1 layer 120, SL2 layer/LL0 layer 130 and SL3 layer/LL1 layer 140 to each of the plurality of recording layers 110, 120, 130, and 140 on the optical disc 100 in the example, respectively, from the lower side of FIGS. 1(*a*) and (*b*), as shown in FIG. 1(*b*). Hereinafter, the two types of recording layer numbers will be explained.

In the example, as a specific example of the first recording layer number of the present invention, a sequential number which is referred to as a signal layer number (SLN) is adopted. Here, the SLN is one example of the recording layer number for specifying each recording layer of the optical disc 100. The SLN is, for example, a sequential number which is sequentially assigned to the respective laminated plurality of recording layers in accordance with their respective disposed positions or the like. In the example shown in FIG. 1(b), for example, SL0, SL1, SL2, and so on are assigned in order from the recording layer 110 on the lower side of FIG. 1(b).

Moreover, in the example, as a specific example of the second recording layer number of the present invention, a sequential number which is referred to as a logical layer number (LLN) is adopted. Here, the LLN is one example of the recording layer number for specifying the recording layer within each layer set of the optical disc 100. The LLN is sequentially assigned to one or each of the plurality of recording layers which belong to the same layer set out of the laminated plurality of recording layers, for example in accordance with the assignment order of the logical address. Moreover, the LLN is a sequential number which is independently assigned within each layer set, and the same sequential number is used in each of different layer sets. For example, sequential numbers (LL0, LL1, and so on) are respectively assigned to a plurality of recording layers which belong to one layer set, and new sequential numbers (LL0, LL1, and so on) are respectively assigned to a plurality of recording layers which belong to another layer set. In one optical disc, the same LLN may be assigned to a plurality of recording layers. In the example shown in FIG. 1(b), LL0 is assigned to the recording layer 110, LL1 is assigned to the recording layer 120, LL0 is assigned to the recording layer 130, and LL1 is assigned to the recording layer 140. The explanation of each recording layer of the optical disc 100 shown in FIG. 1(b) will be continued with reference to the drawings.

The SL0 layer/LL0 layer 110 is a first recording layer (i.e. LL0) which belongs to the layer set 0 corresponding to the rewritable recording format of the optical disc 100. The SL0 layer/LL0 layer 110 has a lead-in area 111, a user data area 112, and a middle area 113.

The SL1 layer/LL1 layer 120 is a second recording layer (i.e. LL1) which belongs to the layer set 0 corresponding to the rewritable recording format of the optical disc 100. The SL1 layer/LL1 layer 120 has a lead-out area 121, a user data area 122, and a middle area 123.

The SL2 layer/LL0 layer 130 is a first recording layer (i.e. LL0) which belongs to the layer set 1 corresponding to the write-once recording format of the optical disc 100. The SL2 layer/LL0 layer 130 has a lead-in area 131, a user data area 132, and a middle area 133.

The SL3 layer/LL1 layer 140 is a second recording layer (i.e. LL1) which belongs to the layer set 1 corresponding to the write-once recording format of the optical disc 100. The SL3 layer/LL1 layer 140 has a lead-out area 141, a user data area 142, and a middle area 143.

Incidentally, in particular, in the SL0 layer/LL0 layer 110 and the SL2 layer/LL0 layer 130, various data is recorded from the inner circumferential side to the outer circumferential side. On the other hand, in the SL1 layer/LL1 layer 120 and the SL3 layer/LL1 layer 140, various data is recorded from the outer circumferential side to the inner circumferential side. In other words, the optical disc 100 in the example corresponds to an optical disc of an opposite track path type. However, for example, the optical disc 100 in the example may be an optical disc of a parallel track path type.

Moreover, each data area in each recording layer may have the same configuration as that of a data area provided for a known optical disc corresponding one recording format which corresponds to the layer set to which each data area belongs, and the data recorded in each data area may have the same format, unless otherwise described.

As explained above, even the recording layers which belong to the same layer set, for example, the logical structure of the SL0 layer/LL0 layer 110 is different from that of the SL1 layer/LL1 layer 120. Moreover, in particular, reference information which is necessary for the recording or reproduction of the data is recorded in the lead-in area 111 provided for the SL0 layer/LL0 layer 110 or the lead-in area 113 provided for the SL2 layer/LL0 layer 130. Thus, it is important to specify the SL0 layer/LL0 layer 110 and the SL2 layer/LL0 layer 130 in performing the recording or reproduction. At this time, by specifying the recording layer with an LLN of 0 in each layer set, it is possible to appropriately specify the recording layer provided with the lead-in area 111 or 131.

Moreover, in order to perform a layer jump to a target recording layer, the target recording layer and a current recording layer need to be specified. In particular, in an optical disc having such a structure that the recording layers have different interlayer thicknesses, a jump amount for the layer jump is specific to a combination of the current recording layer and the target recording layer in many cases. If the current recording layer is not uniquely specified, it is hardly possible to determine an appropriate jump amount. If the layer jump is performed by using an inappropriate jump amount (i.e. amount of adjusting an optical axis of an optical pickup), a focal point of the laser beam is likely not stabilized on the target recording layer, leading to deterioration in recording or reproduction quality.

Thus, according to the SLN in the example, a sequential number is assigned to each of the recording layers of the optical disc, typically in accordance with the laminated arrangement. Thus, it is possible to uniquely specify the current recording layer by reading the SLN included in the sector in each recording layer. Therefore, it is possible to appropriately determine the jump amount for performing the layer jump to a jump-destination recording layer.

Incidentally, for example, in order to perform the layer jump to the recording layer (i.e. LL0 layer) provided with the lead-in area in the layer set to which the current recording layer belongs, the LLN for specifying the LL0 layer and the SLN of the LL0 layer for determining the appropriate jump amount need to be specified. Moreover, the SLN and the LLN of the target recording layer need to correspond to each other.

In the lead-in areas 111 and 131 of the optical disc 100 in the example, the recording layer numbers SLN and LLN associated with each recording layer and the layer set number of the layer set to which each recording layer belongs are stored in association with one another in a form of, for example, a data table. FIG. 2 is an example showing the data table associated with the optical disc 100 in the example.

The left column of the data table shows the SLN (SL0, SL1, SL2, SL3) assigned to each recording layer, the middle column shows the layer set (layer set 0, layer set 1) to which each recording layer corresponds, and the right column shows the LLN (LL0, LL1) assigned by each layer set.

An optical disc apparatus for performing the recording or reproduction on the optical disc 100 can easily obtain the SLN and the LLN assigned to a predetermined recording layer with reference to the data table stored in the lead-in area 111 or 131.

Incidentally, the optical disc in the example is not particularly limited to the optical disc having the four recording layers 110, 120, 130, and 140. It may be provided with more or less recording layers, and the recording format to which each recording layer corresponds may have an arbitrary configuration. Moreover, the physical and logical structures of each recording layer may be set in accordance with the corresponding recording format, as occasion demands. For example, each recording layer may not be provided with the lead-in area, the lead-out area, or the middle area. Alternatively, each recording layer may be further fractionated.

Incidentally, in the optical disc 100 in the example, particularly in each recording layer corresponding to the rewritable or write-once recording format, so-called ADIP may be adopted by which the SLN, the LLN, and the sector number are preformatted in a wobble or the like in advance. On the other hand, in the recording layer corresponding to the read-only recording format, for example, in disc manufacturing, embossed pits are preferably generated by a stamp such that the SLN and the LLN are included in an address area.

(2) Example of Address Area

Next, with reference to FIGS. 3 and FIG. 4, an explanation will be given to the address area for the SLN and the LLN in the data area of the optical disc 100 of the present invention.

Out of the two recording layer numbers of the SLN and the LLN adopted in the example, the LLN assigned by each layer set is the same as the recording layer number used in a conventional multilayer optical disc. In a general optical disc, such a recording layer number is recorded, for example, in a high-order bit or the like of the sector number in each sector. Even in the optical disc 100 in the example, the LLN may be recorded in the high-order bit or the like of the sector number in each sector in the same manner.

On the other hand, the SLN for specifying the recording layer of the optical disc 100 is conventionally not used. Thus, it is necessary to set a new area for storing the SLN.

An ECC block structure generally used in a BD as a specific example of the optical disc 100 of the present invention will be explained with reference to FIG. 3(a) and FIG. 3(b). FIG. 3(a) is a schematic diagram conceptually showing a structure of an ECC block 10 on the optical disc 200 complying with a BD standard, and FIG. 3(b) is a schematic diagram showing a burst indicator sub-code (BIS) block included in the ECC block.

Figure 3:
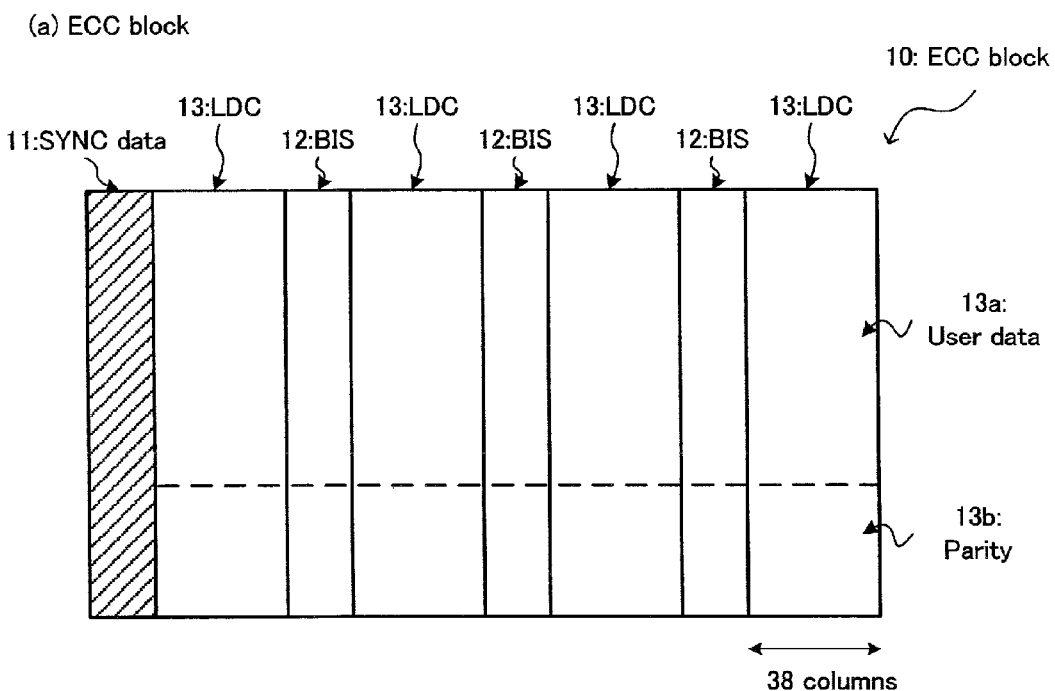
FIG. 3 are schematic diagram conceptually showing an ECC block and a BIS block on the optical disc in the example.
Figure 3:
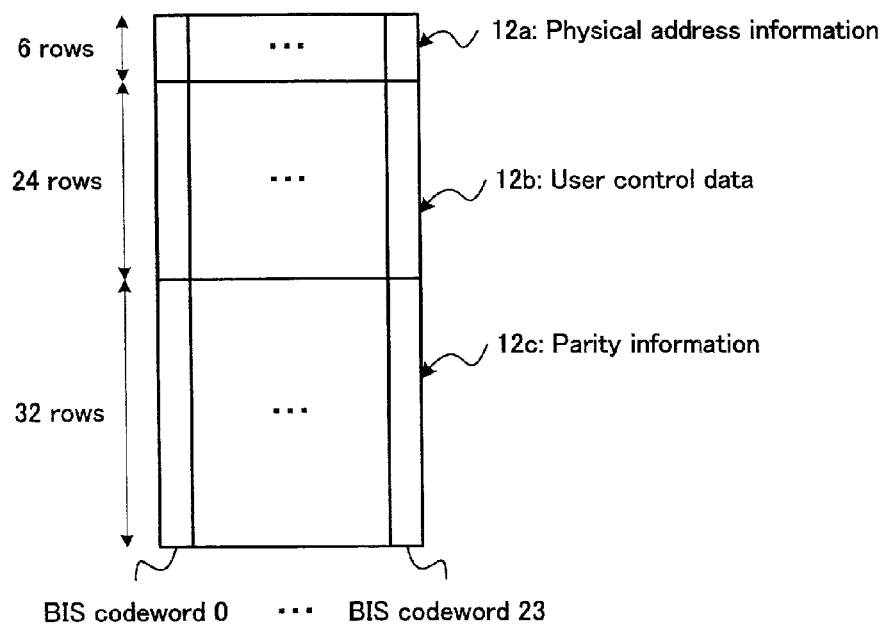
Figure 4:
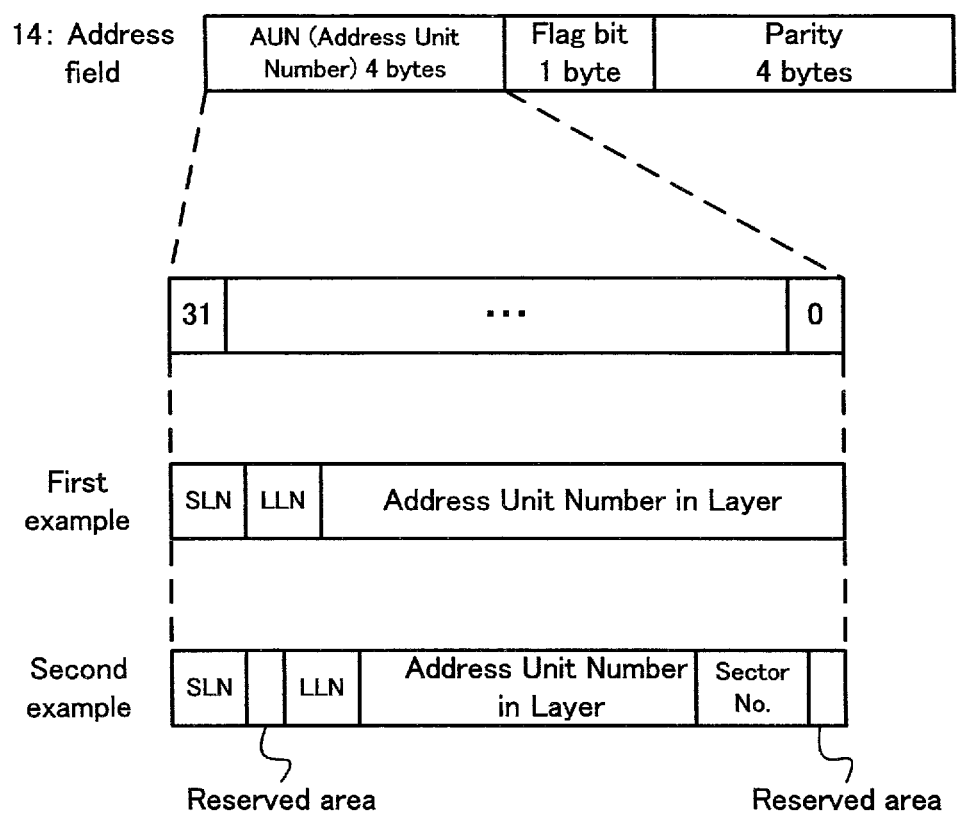
FIG. 4 is a schematic diagram conceptually showing a structure of an address field within the BIS block on the optical disc in the example.

As shown in FIG. 3 (a), the ECC block 10 is a data area whose size is 64 KB and includes: a SYNC data column 11; three BISs 12 each of which is composed of 24 data columns, and a long distance code (LDC) data column 13 which is composed of 152 columns each having a capacity of 496 bytes. The LDC data column 13 is divided into four LDC blocks 13, for example, every 38 columns, by the SYNC data column 11 and the three BISs 12. Incidentally, in the LDC, two bytes are expressed as one code word, and the LDC includes a data portion with a code length of 216 and a parity portion with a code length of 32.

Data in the three BISs 12 is inserted into the ECC block 10 from the 24 columns of BIS block including 30 rows of data, which includes 6 rows of physical address information 12a and 24 rows of user control data 12b, and 32 rows of parity information. Moreover, each column of the BIS block is a BIS code word including 6 bytes of physical address information, 24 bytes of user control data, and 32 bytes of parity information. In other words, the BIS block has 24 BIS code words which are BIS code words 0 to 23 from the left to the right in FIG. 3(b). During decoding, an error in the BIS code word is corrected by parity check based on the parity rows in the BIS code word.

The 6 rows of physical address information 12a in the BIS block is used to record sixteen address fields 14. The address field 14 will be explained with reference to FIG. 4. FIG. 4 is a schematic diagram conceptually showing a structure of one address field 14. Each address filed 14 has 9 bytes of data, in which the first 4 bytes is an address unit number (AUN) portion corresponding to a physical sector, in which the fifth byte is a flag byte for recording a flag bit, and in which the remaining 4 bytes is a parity of the address field.

As a specific example of the address area for storing therein the two types of recording layer numbers (i.e. the SLN and the LLN) of the present invention, the AUN portion in the address field 14 may be used. An explanation will be given to application of the data area in a case where the recording layer numbers are recorded in the AUN portion.

Specifically, as a first example, in the 4-byte (i.e. 32-bit) data area in the AUN portion, 24 bits which is 0 to 23 are used as an Address Unit Number in Layer, the LLN is recorded in the subsequent 4 bits, and the SLN is recorded in the last 4 bits.

Moreover, as a second example, the 4-byte (i.e. 32-bit) data area in the AUN portion may be used as a reserved area whose size is 1 bit, a sector number whose size is 4 bits, a address unit number in layer whose size is 19 bits, a LLN whose size is 3 bits, a reserved area whose size is 2 bits, and a SLN whose size is 3 bits, in this order.

Incidentally, in the optical disc 100 in the example, the configuration of the address area for storing therein the SLN and the LLN is not limited to the aforementioned aspect; for example, another address area or another flag bit area may be adopted as a SLN area, or an address ECC or the like may be adopted as the SLN area.

As explained above, according to the optical disc 100 of the present invention, it is possible to absolutely specify each recording layer of the optical disc 100 and to specify each recording layer in each layer set, with reference to the SLN and the LLN included in each sector in which the data is recorded.

Figure 5:
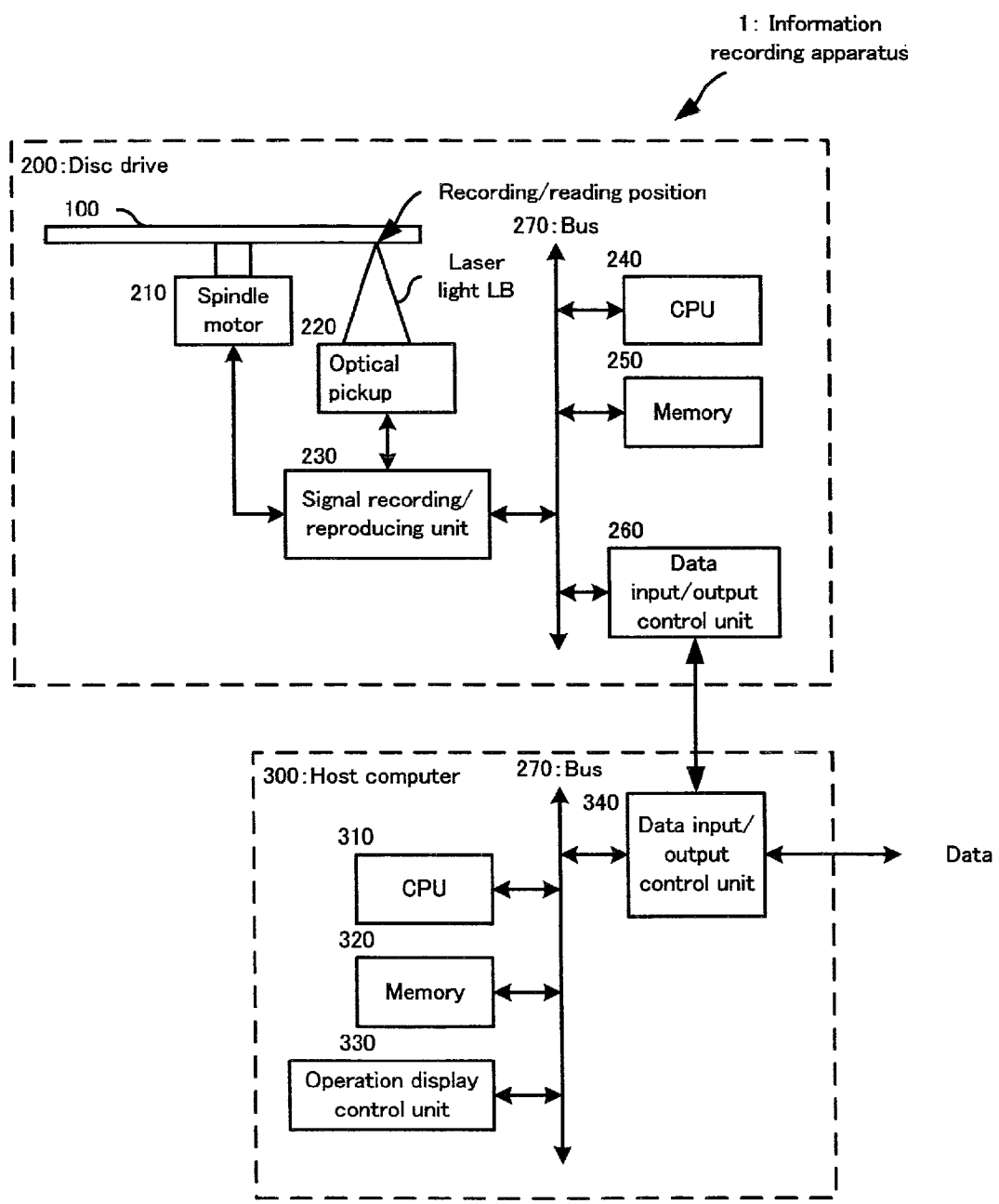
FIG. 5 is a block diagram showing one example of a configuration of an information recording/reproducing apparatus in an example.

(3) Basic Configuration Example of Information Recording/Reproducing Apparatus Next, with reference to FIG. 5, an explanation will be given to an information recording/reproducing apparatus 1 as an example of the information recording/reproducing apparatus of the present invention. FIG. 5 is a block diagram conceptually showing a basic configuration of the information recording/reproducing apparatus 1 in the example. Incidentally, the information recording/reproducing apparatus 1 has a function of recording data onto the optical disc 100 and a function of reproducing the data recorded on the optical disc 100.

As shown in FIG. 5, the information recording/reproducing apparatus 1 has: a disc drive 200 to which the optical disc 100 is loaded and which performs the recording or reproduction of the data; and a host computer 300 such as a personal computer for controlling the operations of the disc drive 200.

The disc drive 200 is provided with: the optical disc 100; a spindle motor 210; an optical pickup 220; a signal recording/reproducing unit 230; a CPU 240; a memory 250; a data input/output control unit 260; and a bus 270. Moreover, the host computer 300 is provided with: a CPU 310; a memory 320; an operation display control unit 330; and a data input/output control unit 340.

The spindle motor 210 is intended to rotate and stop the optical disc 100, and operates upon accessing the optical disc 100. More specifically, the spindle motor 210 is adapted to rotate the optical disc 100 at a predetermined speed and stop it, under spindle servo from a not-illustrated servo unit.

The optical pickup 220 is provided, for example, with a semiconductor laser element, a collimator lens, an objective lens, and the like, which are not illustrated, in order to perform the recording and reproduction on the optical disc 100. More specifically, the optical pickup 220 irradiates the optical disc 100 with a laser beam or the like with a first power as reading light in the reproduction, and irradiates the optical disc 100 with the laser beam or the like while modulating it with a second power as writing light in the recording.

The signal recording/reproducing unit 230 controls the spindle motor 210 and the optical pickup 230 under the control of the CPU 240, thereby performing the recording or reproduction on the optical disc 100. More specifically, the signal recording/reproducing unit 230 is provided, for example, with a laser diode driver (LD driver), a head amplifier, and the like. The laser diode driver generates, for example, a drive pulse and drives a semiconductor laser element 111 disposed within the optical pickup 220. The head amplifier amplifies an output signal of the optical pickup 220, i.e. reflected light of the light beam, and outputs the amplified signal.

The memory 250 is used in general data processing and an OPC process on the disc drive 200, including a buffer area for record/reproduction data, an area used as an intermediate buffer when the data is converted into the data that can be used on the signal recording/reproducing unit 230, and the like. Moreover, the memory 250 is provided with: a read only memory (ROM) area in which a program for performing an operation as a recording device, i.e. a firmware program, is stored; a random access memory (RAM) area which is used as a buffer for temporarily storing the record/reproduction data and in which a variable required for operations of the firmware program or the like are stored; and the like.

The CPU 240 is connected to the signal recording/reproducing unit 230 and the memory 250 through the bus 270, and controls the entire disc drive 200 by giving an instruction to each controlling device. In general, software or firmware for operating the CPU 240 is stored in the memory 250.

Moreover, the CPU 240 in the example constitutes one specific example of the referring device in the recording apparatus or the reproducing apparatus of the present invention. The CPU 240 obtains the recording layer numbers SLN and LLN from the address information on the optical disc 100 which is read via the optical pickup 220. Then, the CPU 240 adjusts the optical axis of the laser light in the optical pickup 220, for example, on the basis of the recording layer numbers SLN and LLN, thereby setting the jump amount of the laser jump to the desired recording layer.

The data input/output control unit 260 controls data input/output from the exterior with respect to the disc drive 200 and performs storage into and extraction from the data buffer on the memory 250. A drive control command issued from the external host computer 300 connected to the disc drive 200 through an interface such as a SCSI and an ATAPI is transmitted to the CPU 240 via the data input/output control unit 260. Moreover, the record/reproduction data is also transmitted to and received from the host computer 300 via the data input/output control unit 260 in the same manner.

The operation display control unit 330 receives an operation instruction and performs displaying, with respect to the host computer 300. For example, the operation display control unit 330 transmits a recording or reproduction instruction or the like inputted via a not-illustrated operation button or the like, to the CPU 310 through the bus 350. The CPU 310 transmits a control command to the disc drive 200 via the data input/output control unit 340 on the basis of the instruction information from the operation display control unit 330, thereby controlling the entire disc drive 200. In the same manner, the CPU 310 can transmit to the disc drive 200 a command to require the disc drive 200 to transmit its operational state. By this, the operational state of the disc drive 200, such as during recording and during reproduction, can be recognized. Thus, the CPU 310 can output the operational state of the disc drive 200 on a not-illustrated display panel, such as a fluorescent tube and a LCD, via the operation display control unit 330.

The memory 320 is an internal storage used by the host computer 300. The memory 320 is provided with a ROM area in which a firmware program such as a basic input/output system (BIOS) is stored; a RAM area in which a variable required for operations of an operating system, an application program or the like is stored; and the like. Moreover, the memory 320 may be connected to a not-illustrated external storage, such as a hard disk, via the data input/output control unit 340.

According to the information recording/reproducing apparatus in the example, it is possible to preferably record the data onto the optical disc 100 and to reproduce the recorded data.

The present invention is not limited to the aforementioned examples, but various changes may be made, if desired, without departing from the essence or spirit of the invention which can be read from the claims and the entire specification. An information recording medium, an information recording apparatus, and an information reproducing apparatus, which involves such changes, is also intended to be within the technical scope of the present invention.

Description of Reference Codes
1 information recording apparatus
10 ECC block
12 BIS
14 address filed
100 optical disc
110 SL0 layer/LL0 layer
120 SL0 layer/LL1 layer
130 SL1 layer/LL0 layer
140 SL1 layer/LL1 layer
200 disc drive
210 spindle motor
220 optical pickup
230 signal recording/reproducing unit
240 CPU
300 host computer

The invention claimed is:

1. An information recording medium having a plurality of recording layers for recording therein data, wherein
   (i) each of the plurality of recording layers comprises: a data area in which the data is recorded; and an address area in which a recording address of the data is recorded,
   (ii) each of the plurality of recording layers corresponds to one of a plurality of recording formats, and
   (iii) each of the plurality of recording layers has:
   a first recording layer number assigned with each of the recording layers; and
   a second recording layer number assigned with a corresponding recording format of the plural recording formats, wherein,
   the first recording layer number is a signal layer number sequentially assigned to the recording layers,
   the second recording layer number corresponds to a logical layer number, and
   the first recording layer number and the second recording layer number are included in the address area.

2. The information recording medium according to claim 1, wherein the plurality of recording formats include at least one of a read-only type, a write-once type, and a rewritable type.

3. An information recording apparatus for recording the data onto the information recording medium according to claim 1, said information recording apparatus comprising:
a referring device for referring to the first recording layer number and the second recording layer number which are included in the address area of the information recording medium; and
a recording device for recording the data on the basis of the first recording layer number and the second recording layer number which are referred to, wherein
said recording device records the data while including the first recording layer number and the second recording layer number in the address area for the data.

4. An information reproducing apparatus for reproducing the data which is recorded on the information recording medium according to claim 1,
said information reproducing apparatus comprising:
a referring device for referring to the first recording layer number and the second recording layer number which are included in the address area of the information recording medium; and
a reproducing device for reproducing the data on the basis of the first recording layer number and the second recording layer number which are referred to.

5. The information recording medium of claim 1, wherein, the address area of first and second recording layers have recorded therein a common logical layer number as the second recording layer number.

6. The information recording medium of claim 5, wherein, the plurality of recording formats include a first recording format and a different, second recording format,
the first recording format is one of i) a rewritable recording format, ii) a write-once recording format, and iii) a read-only recording format, and
the second recording format is another of i) the rewritable recording format, ii) the write-once recording format, and iii) the read-only recording format.

7. The information recording medium of claim 1, wherein, the first recording layer number is the signal layer number sequentially assigned to the recording layers in accordance with a physical disposition position of each recording layer, and
the second recording layer number corresponds to the sequentially assigned logical layer number in accordance with a disposition position of each recording layer of each respective recording format.

8. An information recording medium, comprising:
a plurality of recording layers for recording therein data,
a first of the recording layers being of a first recording format,
a second of the recording layers being of a second recording format, the first and second recording formats being different,
wherein each recording layer comprises
i) a data area in which the data is recorded, and
ii) an address area in which is recorded
a recording address of the data,
a unique first recording layer number assigned with the recording layer, and
a second recording layer number assigned with a corresponding one of the first and second recording formats, the second recording layer number being recorded separately from the first recording layer number,
the address area of the first and second recording layers have recorded therein a common second recording layer number.

9. The information recording medium of claim 8, wherein, the first recording format is a rewritable recording format, and
the second recording format is one of i) a write-once recording format and ii) a read-only recording format.

10. The information recording medium of claim 9, wherein,
the first recording layer number is a signal layer number sequentially assigned to the recording layers, and
the second recording layer number corresponds to a logical layer number.

11. The information recording medium of claim 8, wherein,
the first recording format is one of i) a rewritable recording format, ii) a write-once recording format and iii) a read-only recording format, and
the second recording format is another of i) the rewritable recording format, ii) the write-once recording format and iii) the read-only recording format.

12. The information recording medium of claim 11, wherein,
the first recording layer number is a signal layer number sequentially assigned to the recording layers, and
the second recording layer number corresponds to a logical layer number.

13. The information recording medium of claim 8, wherein,
the first recording layer number is a signal layer number sequentially assigned to the recording layers, and
the second recording layer number corresponds to a logical layer number.

14. The information recording medium of claim 8, wherein,
the first recording layer number is a signal layer number sequentially assigned to the recording layers, and
the second recording layer number is a logical layer number,
the address area of the first and second recording layers have recorded therein a common logical layer number as the second recording layer number.

15. The information recording medium of claim 8, wherein,
the first recording layer number is a signal layer number sequentially assigned to the recording layers in accordance with a physical disposition position of each recording layer, and
the second recording layer number corresponds to a sequentially assigned logical layer number in accordance with a disposition position of each recording layer of each respective recording format.

* * * * *